July 14, 1936.
M. SCHILDE
2,047,802
SPRING
Filed April 2, 1935
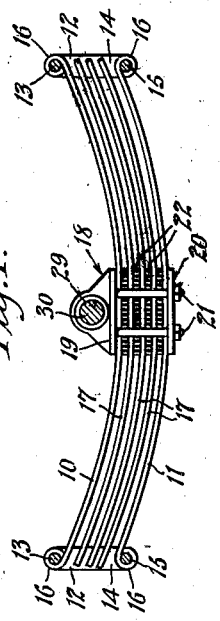
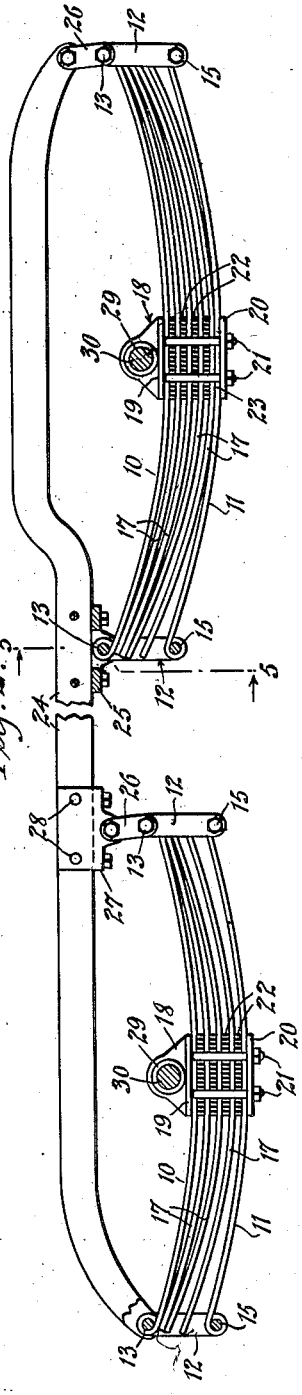
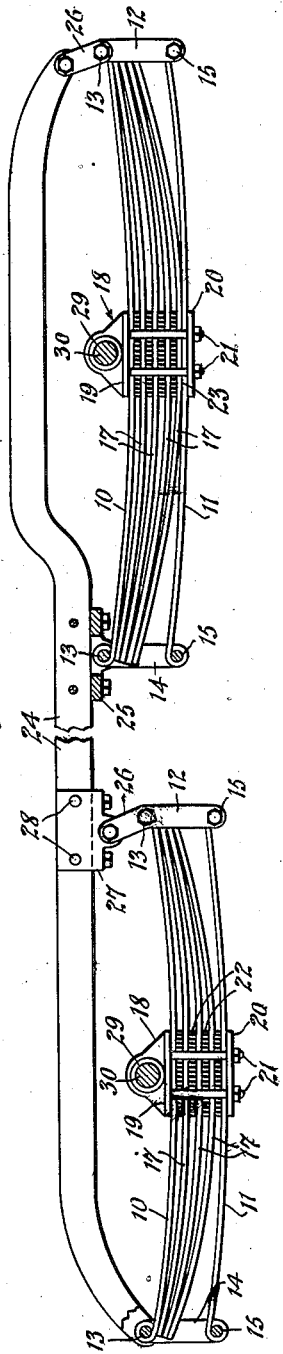
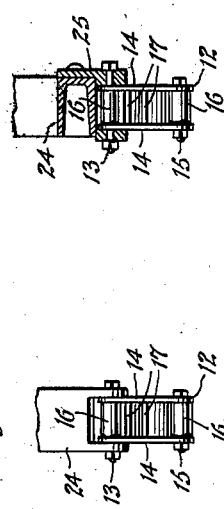
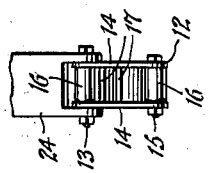
WITNESSES
Edw. Thorpe
Chris Peinle
INVENTOR
Martin Schilde
BY
Munn, Anderson & Liddy
ATTORNEY Patented July 14, 1936

2,047,802

UNITED STATES PATENT OFFICE 2,047,802

SPRING

Martin Schilde, New Orleans, La.

Application April 2, 1935, Serial No. 14,310

5 Claims. (Cl. 267—47)

This invention relates to a suspension spring designed and adapted to be used advantageously on automobiles and similar vehicles.

More particularly the invention relates to main vehicle suspension springs of the bowed or semi-elliptical types.

An object of the invention is the provision of a spring of the indicated character which has the advantage of not only increasing the resiliency, as compared with the present suspension springs in use today, but will also produce a uniform resiliency so that an automobile or similar vehicle equipped with the spring and solid resilient or airless tires, in place of pneumatic tires, will ride smoother and easier and with the same degree of increased resiliency when partly loaded, as when loaded to full capacity, because the spring adjusts itself to any particular load below full capacity, thereby making the vehicle ride with the same resiliency as when fully loaded.

Another object of the invention is to so construct a spring for vehicle spring suspensions in which the springs are capable of offering the proper supporting resiliency to the body of the vehicle under all conditions.

Another object of the invention is to so construct a spring that a vehicle to which it is attached will ride with an equal degree of resiliency when empty as when loaded to full capacity.

Another object of the invention is the provision of a load-sustaining spring embodying main leaves and supplemental leaves, the main leaves being initially active to take up the load, and as the load imposed increases, the supplemental leaves in seriatim contribute to sustain the load.

Some of the advantages of the spring are as follow: It stands up under abnormal strains and stresses. It eliminates friction and thereby increases the resiliency and riding quality of the vehicle or automobile. It will be strong and safe and will not require special shackles. A vehicle may travel on solid or resilient airless tires thereby eliminating the danger of having a blow-out, or a tire to burst on one of the front wheels when traveling at a high rate of speed, thereby avoiding accidents and the destruction of life and property.

The nature of the invention and its distinguishing features and advantages will appear when the following specification is read in connection with the accompanying drawing in which—

Fig. 1 is a view in elevation partly in section of a spring constructed in accordance with the invention;

Fig. 2 is an elevation partly broken away, and partly in section, of the side frame of a vehicle chassis, showing the complete spring suspension of the vehicle and also the springs in the position occupied when partly compressed;

Fig. 3 is a view similar to Fig. 2 but showing the position occupied by the leaves of the springs under greater compression;

Fig. 4 is a view of the front end of the side frame and spring;

Fig. 5 is a vertical section taken on the line 5—5 of Fig. 2.

Referring now more particularly to the drawing, it will be apparent that, as shown in Fig. 1, a spring constructed in accordance with the invention comprises a main upper leaf 10 and a main lower leaf 11. The leaves 10 and 11 are maintained in spaced relation with respect to each other by shackles 12 arranged at the opposite ends of the spring respectively. Each shackle consists of a frame bolt 13, hangers or links 14 pivotally connected with the bolt 13 in spaced relation to each other, and a bolt 15 extending through the lower ends of the links 14. The opposite ends of the upper leaf 10 are connected with the frame bolts 13 respectively, and the opposite ends of the lower leaf 11 are connected with the bolts 15 respectively. In each case the connection is made by an eye 16 formed on each end of the leaf through which the bolt extends.

The spring also includes a plurality of intermediate supplemental leaves 17. There are three of these leaves 17 in the present instance and they are arranged between the leaves 10 and 11. It is to be understood that any suitable number of supplemental leaves 17 may be used depending upon the capacity of the load to be sustained by the spring. All of the leaves are bowed longitudinally in the same direction, or in other words are normally semi-elliptical.

The leaves 10, 11, and 17 constituting the spring are maintained together by means of a centrally disposed clip 18 consisting of an upper plate 19 and a lower plate 20 secured together by means of bolts 21.

The leaves constituting the spring are maintained in spaced relation to each other by spacers 22 of vulcanized hard rubber. The spacers 22 keep the leaves separated throughout the entire length thereof under normal conditions. The spacers keep the leaves from becoming loose, or from shifting, or from getting out of line. They also prevent moisture from getting between the leaves and the spacers themselves, thereby keeping the leaves from rusting and thus avoiding fracture thereof. The spacers being of a resilient nature will also produce a cushioning effect.

In the form of the invention shown in Fig. 2, the rear or main spring is formed with its lower leaf 17 in contact with the lower main leaf 11, as indicated by the reference numeral 23. This form of spring, however, is employed for the main springs of the spring suspension, the forward springs having the main lower leaf 11 spaced with respect to the next adjacent supplemental leaf 17, as clearly shown to the left in Figs. 2 and 3.

In Figs. 2 and 3 there is shown one side of a frame 24 of a vehicle chassis. The forward shackle 12 of the rear spring is pivotally connected with the frame 24 by mounting its bolt 13 in a suitable bracket 25 on the frame. The rear end of this spring is pivotally connected with the rear end of the frame 24 by means of a supplemental shackle or hanger 26. The front spring has the forward end thereof pivotally connected with the forward end of the frame 24 by having the bolt 13 of the forward shackle pivotally connected with the forward terminal of the frame 24. The rear shackle 12 of the front spring is pivotally connected with the frame 24 by means of a supplemental shackle or hanger 26, which in turn is pivotally connected with a suitable bracket 27 rigidly secured to the frame 24 by suitable fastening elements 28.

The clip 18 for each spring has a suitable axle-receiving opening 29 through which the related axle 30 extends in order that the clip and the chassis may be properly supported by the wheels of the vehicle.

The operation of each spring is as follows: When the body of the vehicle is placed on the chassis, the leaves of each spring will assume the relationship shown in Fig. 2. It will be apparent that certain of the supplemental leaves 17 contact with each other at their end portions. As the body of the vehicle is loaded, the supplemental leaves 17 are further compressed until all of them are in contact with each other at their ends as shown in Fig. 3. The weight of the body and the load carried thereby is first sustained or taken up by the main leaves 10 and 11. As the load imposed increases, the ends of the leaves 10 and 11 move downwardly and the ends of the upper leaf 10 bear on the ends of the next adjacent supplemental leaf 17. As the load is further increased to full capacity, the adjacent ends of the remaining supplemental leaves 16 engage each other in seriatim or progressively. Under the full load, the lower leaf 11 straightens out longitudinally. It will be apparent that when the vehicle carries a load less than a full capacity load, the weight thereof is sustained by the main leaves 10 and 11, while the supplemental leaves 17 remain passive. As the weight to be carried increases, the supplemental leaves 17 contribute one after the other to sustain the weight in proportion to the increase thereof.

From the foregoing it will be obvious that there is described hereinabove a spring by virtue of which the objects and advantages set forth may be attained.

I claim:

1. A vehicle spring comprising a main upper bowed leaf, a main lower bowed leaf, a plurality of intermediate supplemental leaves each bowed in the same direction as the main upper and lower leaves, spaced pivoted shackles, and an axle clip, the upper and lower leaves each having the opposite ends thereof connected with said shackles respectively, the upper, lower and supplemental leaves being secured to said clip between the ends thereof, said leaves being normally out of contact with each other throughout the entire length thereof, the provision and arrangement being such that the main upper and lower leaves first take up the load imposed, and the supplemental leaves at their ends engage in seriatim the adjacent ends of the upper leaf and each other as the load imposed increases.

2. A vehicle spring comprising a main upper leaf, a main lower leaf in spaced relation to the upper leaf, shackles connecting the adjacent ends of said leaves respectively in spaced relation, a plurality of supplemental leaves arranged between the upper and lower leaves and having their free ends disposed between the links of said shackles, spacers between said leaves to maintain them normally in spaced relation to each other and to the upper and lower leaves, and a clip clamping all of the leaves and spacers together, the provision and arrangement being such that the main upper and lower leaves first take up the load imposed, and the supplemental leaves at their ends engage in seriatim the adjacent ends of the upper leaf and each other as the load imposed increases.

3. A vehicle spring comprising a main upper bowed leaf, a main lower bowed leaf, a plurality of intermediate supplemental leaves each bowed in the same direction as the main upper and lower leaves, spaced shackles, and an axle clip, each of said shackles consisting of an upper bolt, spaced links pivotally connected with said bolt, and a second bolt carried by the lower ends of said links, a hanger pivotally connected with the upper bolt of one of said shackles the opposite ends of the upper leaf being connected with said frame bolts respectively, the opposite ends of the lower leaf being connected with said second bolts respectively, the upper, lower and supplemental leaves being secured to said clip between the ends of the former, said leaves being normally out of contact with each other throughout the entire length thereof, the provision and arrangement being such that the main leaves first take up the load, and as the load imposed increases the ends of the main leaves move downwardly and respectively engage the ends of the next adjacent supplemental leaf, and as the load imposed further increases, the adjacent ends of the remaining supplemental leaves engage each other in seriatim.

4. The combination with the frame and an axle of a vehicle, of a load suspension spring comprising an upper leaf, a lower leaf in spaced relation to the upper leaf, a plurality of supplemental leaves arranged between the upper and lower leaves, a pair of shackles one at each end of the spring connected with said frame by the upper bolt thereof, at least one of said shackles being connected with said frame for pivotal movement, the opposite ends of the upper leaf being connected with the upper shackle bolts respectively, the opposite ends of the lower leaf being connected with the lower bolts of the shackles respectively, spacers between said leaves to normally maintain them out of contact with each other throughout the entire length thereof, and a clip connected with said axle which clamps said leaves and spacers together and connects said leaves between their ends with the axle, the arrangement of the leaves being such that the upper and lower leaves first take up the load imposed, and the supplemental leaves at their ends engage in seriatim the adjacent ends of the upper leaf and each other as the load imposed increases.

5. The combination with the frame and an axle of a vehicle, of a load suspension spring comprising main leaves and supplemental leaves, shackles connecting the main leaves to the frame, at least one of said shackles being connected with the frame for pivotal movement, means connecting the main and supplemental leaves with the axle, and means between the leaves to maintain them normally out of contact with each other throughout the entire length thereof, the provision and arrangement being such that the upper and lower leaves first take up the load imposed, and the supplemental leaves at their ends engage in seriatim the adjacent ends of the upper leaf and each other as the load imposed increases.

MARTIN SCHILDE.